(12) United States Patent
Graham et al.

(10) Patent No.: US 9,087,322 B1
(45) Date of Patent: Jul. 21, 2015

(54) ADAPTING SERVICE PROVIDER PRODUCTS FOR MULTI-TENANCY USING TENANT-SPECIFIC SERVICE COMPOSITION FUNCTIONS

(75) Inventors: Stephen G. Graham, Chapel Hill, NC (US); David A. Ohsie, Baltimore, MD (US); John D. Hushon, Medfield, MA (US)

(73) Assignee: EMC Corporation, Hopkinton, MA (US)

( * ) Notice: Subject to any disclaimer, the term of this patent is extended or adjusted under 35 U.S.C. 154(b) by 581 days.

(21) Appl. No.: 13/334,702

(22) Filed: Dec. 22, 2011

(51) Int. Cl.
G06F 15/16 (2006.01)
G06Q 10/10 (2012.01)
H04L 29/06 (2006.01)

(52) U.S. Cl.
CPC ............... *G06Q 10/10* (2013.01); *H04L 29/06* (2013.01)

(58) Field of Classification Search
USPC .......................... 709/203, 204, 217, 218, 219
See application file for complete search history.

(56) References Cited

U.S. PATENT DOCUMENTS

| 7,873,992 B1* | 1/2011 | Daily et al. ..................... 726/11 |
| 2002/0029296 A1* | 3/2002 | Anuff et al. ................... 709/311 |
| 2003/0191812 A1* | 10/2003 | Agarwalla et al. ............ 709/217 |
| 2011/0047246 A1* | 2/2011 | Frissora et al. ................ 709/219 |
| 2011/0126197 A1* | 5/2011 | Larsen et al. ..................... 718/1 |
| 2011/0209069 A1* | 8/2011 | Mohler .......................... 715/744 |
| 2012/0128334 A1* | 5/2012 | Cheok et al. .................. 386/278 |
| 2013/0031639 A1* | 1/2013 | Liu et al. .......................... 726/28 |
| 2013/0073389 A1* | 3/2013 | Heath ........................ 705/14.54 |
| 2013/0095864 A1* | 4/2013 | Marovets ...................... 455/466 |

OTHER PUBLICATIONS

D. Hinchcliffe et al., "EMML Changes Everything: Profitability, Predictability & Performance through Enterprise Mashups," sponsored by Open Mashup Alliance, 2009, 17 pages, Alexandria, Virginia.

* cited by examiner

*Primary Examiner* — David Lazaro
*Assistant Examiner* — Vitali Korobov
(74) *Attorney, Agent, or Firm* — Ryan, Mason & Lewis, LLP

(57) ABSTRACT

A multi-tenancy adapter is configured to provide an interface between a plurality of tenants and a service provider product that is shared by those tenants. The multi-tenancy adapter in one embodiment comprises a plurality of tenant-specific mashup functions or other service composition functions associated with respective ones of the plurality of tenants. In conjunction with receipt of a service request from a given one of the plurality of tenants, the multi-tenancy adapter generates a corresponding request directed to the product, applies the particular service composition function associated with the given tenant in order to filter response information received back from the product in a manner specific to that tenant, and provides the filtered response information to the given tenant.

20 Claims, 3 Drawing Sheets

ADAPTING SERVICE PROVIDER PRODUCTS FOR MULTI-TENANCY USING TENANT-SPECIFIC SERVICE COMPOSITION FUNCTIONS

FIELD

The field relates generally to information processing, and more particularly to techniques for supporting utilization of software and other products by tenants in an information processing system that may comprise cloud infrastructure.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used by cloud service providers to build a variety of different types of virtual infrastructure, including private and public cloud computing and storage systems, which may be distributed across hundreds of interconnected computers, storage devices and other physical machines.

In cloud-based information processing system arrangements of the type described above, enterprises in effect become tenants of the cloud service providers. Thus, a given tenant may share hardware or software resources or other products with other tenants. However, not all products that are sold into the cloud service provider space are configured to support such multi-tenancy.

This lack of multi-tenancy support creates difficulties for the cloud service provider, in that the provider may have to avoid usage of certain products not configured for multi-tenancy, or face an increase in its product costs by adding separate instances of such products for each tenant.

It is also problematic for the product manufacturer, in that the manufacturer may have difficulty selling products that are not configured for multi-tenancy, or may face increased development costs to adapt each of its products to support multi-tenancy. More particularly, making significant changes to the internal working of products to support multi-tenancy requires a substantial skills and resource commitment on behalf of the product manufacturer. Furthermore, making changes natively within each product poses a time-to-market challenge, delaying the ability of the product manufacturer to compete in cloud service marketplaces where multi-tenancy is an important feature.

SUMMARY

Illustrative embodiments of the invention provide service composition based multi-tenancy adaptation techniques for use in information processing systems to facilitate sharing of a service provider product by multiple tenants. For example, such techniques allow a product that is not otherwise configured to support multi-tenancy to nonetheless be shared by multiple tenants of a cloud service provider.

In one embodiment, a multi-tenancy adapter is configured to provide an interface between a plurality of tenants and a product that is provided by a service provider and shared by those tenants. The multi-tenancy adapter comprises a plurality of tenant-specific mashup functions or other service composition functions associated with respective ones of the plurality of tenants. In conjunction with receipt of a service request from a given one of the plurality of tenants, the multi-tenancy adapter generates a corresponding request directed to the product, applies the particular service composition function associated with the given tenant in order to filter response information received back from the product in a manner specific to that tenant, and provides the filtered response information to the given tenant.

The multi-tenancy adapter in an illustrative embodiment may comprise a plurality of tenant-specific portals for respective ones of the plurality of tenants, with each of the tenant-specific portals implementing a corresponding application programming interface (API) proxy for converting product-specific information from the product into tenant-specific information for the corresponding tenant using a corresponding one of a plurality of tenant-specific service composition functions.

One or more of the illustrative embodiments may advantageously avoid the need for cloud service providers to choose to deploy only products that support multi-tenancy or to excessively duplicate single-tenant products by adding separate instances of those products for each tenant. Moreover, one or more such embodiments may allow product manufacturers to better market their single-tenant products to cloud service providers, while also avoiding the increased development costs, time-to-market challenges and other issues associated with reconfiguring products to support multi-tenancy.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Moreover, the term "information processing system" as used herein is intended to be broadly construed, so as to encompass, for example, private or public cloud computing or storage systems, as well as other types of processing systems comprising physical or virtual processing resources in any combination.

Figure 1:
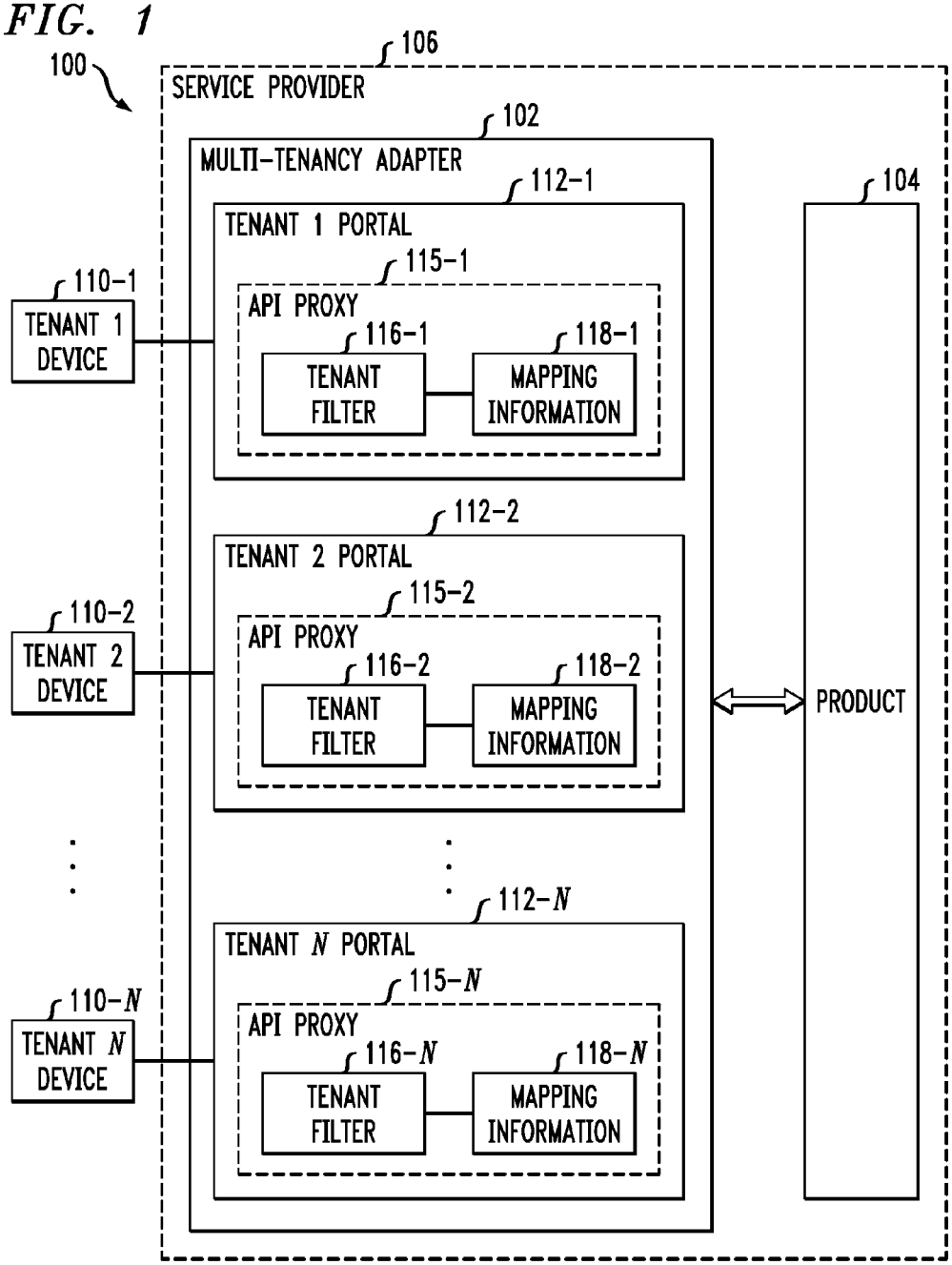
FIG. 1 is a block diagram of an information processing system that incorporates a multi-tenancy adapter in an illustrative embodiment.

FIG. 1 shows an information processing system 100 configured in accordance with an illustrative embodiment of the present invention. The information processing system 100 comprises a multi-tenancy adapter 102 which is coupled to a product 104 of a service provider 106. A plurality of tenants associated with respective tenant devices 110-1, 110-2, . . . 110-N share the product 104. The term "tenant" as used herein is intended to be broadly construed, and may be used to refer to a user or other entity, its associated device or both. The same reference numeral 110 will be used for all of these cases. The tenants 110 are also denoted herein as Tenant 1, Tenant 2, . . . Tenant N.

The product 104 may comprise, for example, a software product running on a processing platform of the service provider 106, although other types of products, including service products, hardware products or virtualized products, may additionally or alternatively be shared by at least a subset of the tenants 110. It may be assumed for purposes of illustration that the product 104 is not itself configured for multi-tenancy. Also, the product 104 may comprise a particular combination of multiple distinct products, such as a designated combination of multiple services available from the service provider.

The service provider 106 may comprise a cloud service provider having cloud infrastructure, with the cloud infrastructure comprising physical infrastructure and associated virtualization infrastructure running on the physical infrastructure. The term "service provider" as used herein is also intended to be broadly construed, so as to encompass, for example, any entity that makes one or more available software functions invokable over a network. The product 104 may therefore comprise software products in the form of application programs or other types of programs running on virtual machines that are implemented using cloud infrastructure.

An example of a processing platform suitable for providing these and other types of information technology infrastructure suitable for implementing at least a portion of the system 100 will be described in more detail below in conjunction with FIG. 4.

With continued reference now to FIG. 1, the multi-tenancy adapter 102 comprises a plurality of tenant-specific portals 112-1, 112-2, . . . 112-N for respective ones of the plurality of tenants 110. Each of the tenant-specific portals 112 implements a corresponding tenant-specific proxy element 115 for converting product-specific information from the product 104 into tenant-specific information for the corresponding tenant 110 using a corresponding one of a plurality of tenant-specific service composition functions. The proxy elements 115 in the present embodiment more specifically comprise respective application programming interface (API) proxies.

As a more particular example, one or more of the proxy elements may comprise model supplier adapter (MSA) proxies for converting product-specific MSA information from the product 104 into tenant-specific MSA information for the corresponding tenant 110 using a corresponding one of the tenant-specific service composition functions, where MSA is a particular style of representational state transfer (REST) API defined by EMC Corporation of Hopkinton, Mass.

In such an arrangement, multi-tenancy functionality can be layered on top of any product that exposes its data and behavior using the MSA standard. This tenant-specific MSA proxy looks to the tenant like an MSA, but it is configured to invoke the MSA implemented by the product and to filter responses back to the tenant such that those responses involve only resources that are relevant to that tenant. The filtering mechanism in an arrangement of this type may be implemented, for example, by a mashup combining full feeds of resources coming from product MSAs with a mapping of which resources are relevant to the given tenant. It should be appreciated, however, that use of an MSA proxy or other particular type of API proxy is not a requirement of any particular embodiment of the invention. Thus, other types of REST APIs or more generally other types of proxies may be used in the respective tenant portals 112 in other embodiments.

In operation, the multi-tenancy adapter 102 receives incoming service requests from the tenants 110, generates corresponding outgoing service requests directed to the product 104, and filters the resulting responses using tenant-specific service composition functions. Thus, for a given one of the tenants 110, the multi-tenancy adapter 102 via the corresponding tenant-specific portal 112 applies a tenant-specific service composition function in order to filter response information received back from the product 104 in a manner specific to that particular tenant. The multi-tenancy adapter 102 then provides the filtered response information to the given tenant. Similar operations are performed by the multi-tenancy adapter 102 for each of the other tenants 110.

For a given incoming service request, the multi-tenancy adapter 102 may identify the particular tenant associated with the request through the use of authentication mechanisms or other request processing techniques. As one more particular example, the multi-tenancy adapter may comprise an input filter or router configured to provide authentication directed request routing across a differential set of tenant portals.

The multi-tenancy adapter 102 thus provides an interface between the tenants 110 and the product 104 in a manner that permits the sharing of the product by the tenants even though the product itself is not configured to support multi-tenancy. The multi-tenancy adapter 102 may comprise a service composition manager, not explicitly shown in the figure, to manage the tenant-specific composition functions of the tenants 110.

The service composition function in the present embodiment may more particularly comprise a mashup function, and such a mashup function may be configured in accordance with standards established by the Open Mashup Alliance. For example, one or more of the mashup functions in the present embodiment may be implemented using Enterprise Mashup Markup Language (EMML). Additional details regarding EMML are described in "EMML Changes Everything: Profitability, Predictability & Performance through Enterprise Mashups," 2011, available from the Open Mashup Alliance.

The tenant-specific proxy elements 115 in the present embodiment each more particularly comprise a tenant filter 116 and a set of mapping information 118. The tenant filter 116 for a given tenant filters response information from the product 104 before that information is delivered to the tenant. The tenant filter 116 operates using the mapping information 118 which may be configured, for example, to characterize which of a plurality of resources of the product are relevant to the given tenant. Thus, the tenant filter 116 utilizes mapping information 118 to ensure that the filtered response information provided back to the given tenant responsive to a service request from that tenant to the product 104 comprises only information associated with those product resources that are relevant to the given tenant, as determined from the mapping information.

At least a portion of the filtered response information and corresponding unfiltered response information may be archived under control of the multi-tenancy adapter 102 to facilitate demonstration of filtering policy compliance. The filtered response information may encompass, for example, transformed vocabulary, response normalization, supporting analytics, as well as a variety of other types of information for facilitating the use of product 104 by the given tenant.

Figure 2:
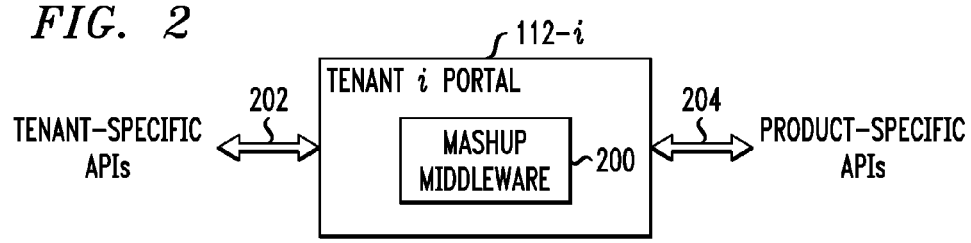
FIG. 2 illustrates an interface provided by a tenant portal of the multi-tenancy adapter of the FIG. 1 system.

The service composition functions associated with the tenant portals may be implemented using mashup middleware as illustrated in FIG. 2. As shown, a given one of the tenant portals 112-$i$, $i=1, 2, \ldots N$, comprises mashup middleware 200 that may be utilized to provide at least a portion of the corresponding API proxy 115-$i$. The tenant portal 112-$i$ comprising mashup middleware 200 provides an interface between tenant-specific APIs 202 and product-specific APIs 204 as shown in the figure. The mashup middleware may comprise one or more mashups each implemented using a suitable mashup platform, such as the JackBe Presto platform. Other mashup platforms that may be used in embodiments of the invention include, for example, Yahoo Wires, Corizon, Microsoft Popfly, Kapow and Nexaweb. Also, one or more mashups can be built as web applications, for example, using Javascript programming in a browser application.

The multi-tenancy adapter 102 may be implemented on a common processing platform with the product 104, or alternatively these elements may each be implemented on separate processing platforms. Also, although shown in FIG. 1 as being part of the service provider 106, the multi-tenancy adapter can be implemented in other parts of the system, and need not share any infrastructure with the service provider. It is also to be understood that a given embodiment of the system 100 may include multiple instances of the elements 102, 104 and 106, although only single instances of such elements are shown in the system diagram for clarity and simplicity of illustration.

The operation of the multi-tenancy adapter 102 will now be described in greater detail with reference to FIG. 3. In this figure, two of the tenant-specific portals 112-1 and 112-2 of the multi-tenancy adapter 102 are shown. These portals include respective central authentication service (CAS) elements 300-1 and 300-2 for use in authenticating communications from respective tenants 110-1 and 110-2. It should be noted, however, that any of a wide variety of other authentication techniques may be used in place of CAS in order to ensure that each tenant is able to access its corresponding portal but not the portals of the other tenants.

The Tenant 1 portal 112-1 includes a plurality of topology service components 302-1, an event service component 304, and an alert service component 306, and may include additional or alternative components for other services. Other embodiments need not include the particular illustrative portal components shown in FIG. 3 or any other components for particular combinations of services or other types of products. The portal components 302-1, 304 and 306 correspond generally to actual services 312, 314 and 316 implemented in product 104. Thus, in the present embodiment, the topology service 312, event service 314 and alert service 316 should be viewed as examples of sub-products of product 104 for which multi-tenancy support is being provided in this embodiment.

The Tenant 1 portal 112-1 further comprises a database 308 for storing at least the tenant-specific mapping information 118-1. The Tenant 2 portal 112-2 includes a plurality of topology service components 302-2, and may include other components not explicitly shown in the figure, such as a database for storing tenant-specific mapping information 118-2.

The product 104 in this embodiment exposes full APIs for the plurality of topology service components 312, the event service component 314, and the alert service component 316, and may include additional or alternative components for other services or, more generally, for other types of products.

As illustrated, the Tenant 1 portal 112-1 includes tenant filter 116-1 and tenant-specific mapping information 118-1 stored in database 308. It is assumed that the Tenant 2 portal 112-2 includes tenant filter and tenant-specific mapping information, although those elements are not explicitly shown.

Figure 3:
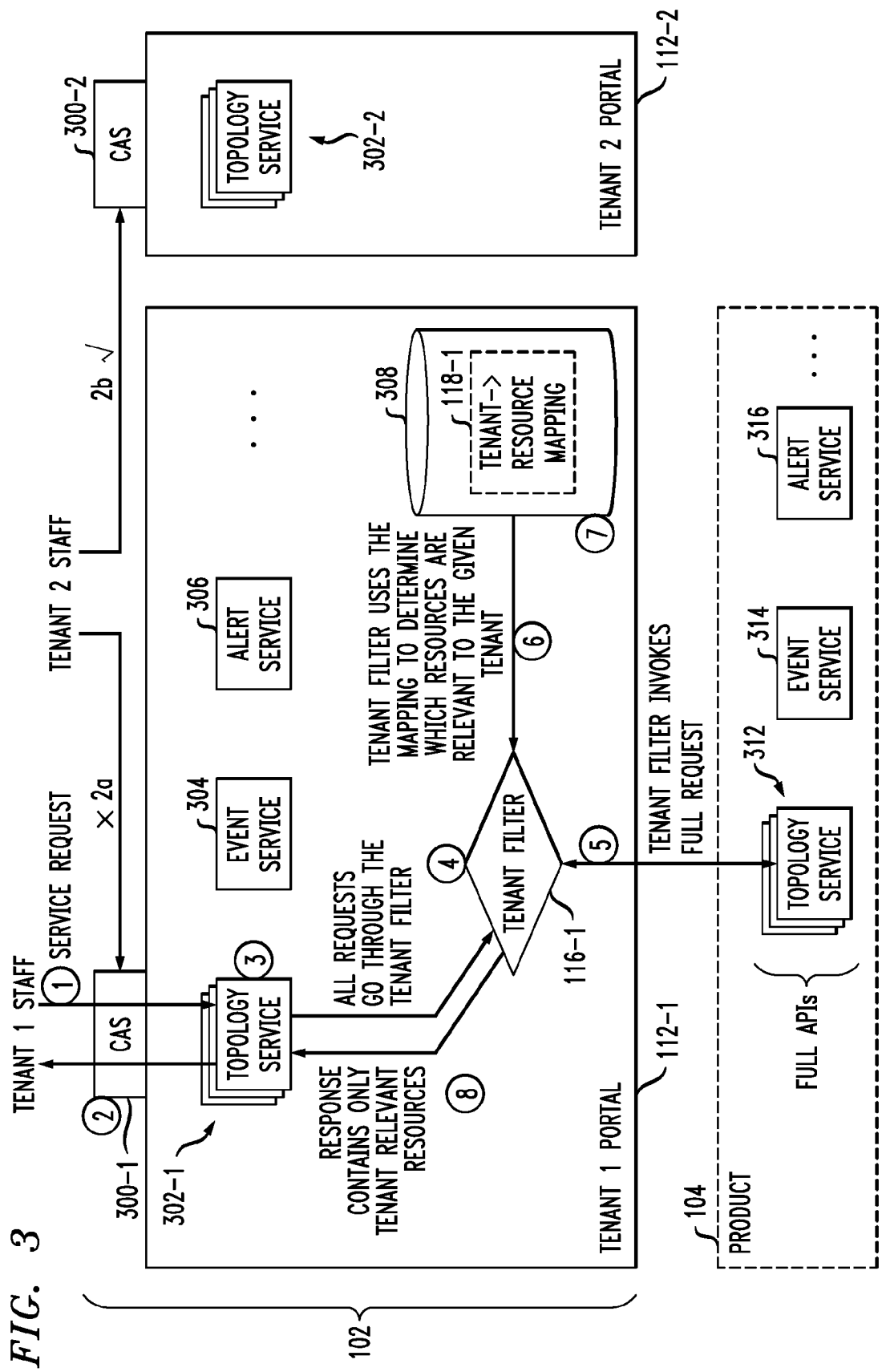
FIG. 3 is a diagram showing exemplary processing operations performed by the multi-tenancy adapter of the FIG. 1 system.

The arrangement illustrated in FIG. 3 also shows a number of processing steps, designated as steps 1 through 8. It is assumed that each tenant 110 is provided with a uniform resource locator (URL) or other identifier that allows it to access its corresponding tenant-specific portal 112. Service requests from a given tenant are delivered to the corresponding portal, subject to authorization using the CAS 300. For example, each tenant portal may be specified by a unique tenant-specific base URL, such as https://tenant1.emc.com/portal/msa/ . . . , or https://tenant1.emc.com/portal/eventservice/ . . .

In step 1, a service request is received at portal 112-1 from an administrator or other staff member associated with Tenant 1.

In step 2, the service request is processed using CAS element 300-1 in order to ensure that the request originates from an authorized entity associated with Tenant 1. Service requests from other tenants will be denied access to the Tenant 1 portal. Thus, a service request from Tenant 2 will be denied access to the Tenant 1 portal as indicated at 2a, but will be granted access to the Tenant 2 portal as indicated at 2b.

In step 3, the particular service components needed to process the service request are indentified.

In step 4, a mashup function is invoked in order to provide the tenant filter 116-1. As previously described, this tenant filter is responsible for filtering out resource information that is not associated with the tenant, so that all responses back to that tenant will contain information related to tenant relevant resources.

In step 5, the tenant filter invokes the full request to the product 104 via one or more of the full APIs that the product exposes for its service components 312, 314 and 316. The tenant filter sends the service request to the product. In other embodiments, other components of the multi-tenancy adapter 102 may be used to direct the service request to the product.

In step 6, the tenant filter 116-1 issues a request to a database containing the tenant-specific mapping information 118-1. This request is used to determine which resources of the product 104 are associated with the given tenant. This request or portions thereof may make use of Uniform Resource Identifiers (URIs) or other types of indicators. For example, the request may comprise one or more database queries of the form "is resource URI {uri1} relevant to the tenant, yes or no?"

In step 7, the database retrieves the requested tenant-to-resource mapping information 118-1 and makes it available to the tenant filter 116-1.

In step 8, the tenant filter 116-1 filters the response information from product 104 based on the mapping information 118-1, such that the response provided back to the tenant via platform component 302-1 contains only resources that are relevant to the tenant. The tenant filter is therefore configured to ensure that feeds back to the tenant are properly and fully populated with the appropriate tenant-specific information.

It is to be appreciated that the particular process steps shown and described in conjunction with FIG. 3 are exemplary only, and that additional or alternative steps may be used in other embodiments. Also, the ordering of the steps may be altered in other embodiments. Thus, for example, steps that are shown as being performed in one order in the figure may be performed in other orders in other embodiments, or steps that are performed serially may be performed at least in part in parallel with one another.

The illustrative embodiments described above advantageously allow existing products that are not otherwise configured to support multi-tenancy to nonetheless participate in the service provider marketplace, where multi-tenancy is often a key "must have" feature. The multi-tenancy functionality is provided in an efficient and non-invasive manner, and with little or no impact on product development schedules.

It is to be appreciated that the particular sets of modules and other components as implemented in the system 100 as illustrated in FIGS. 1-3 are presented by way of example only. In other embodiments, only subsets of these components, or additional or alternatives sets of components, may be used, and such components may exhibit alternative functionality and relationships.

As indicated previously, the system 100 may be implemented using one or more processing platforms. An example of such a processing platform is processing platform 400 shown in FIG. 4. The processing platform 400 in this embodiment comprises a portion of the system 100 and includes a plurality of servers, denoted 402-1, 402-2, 402-3, . . . 402-M, which communicate with one another over a network 404. A given such server may be viewed as an example of what is more generally referred to herein as a "processing device." Other examples of processing devices may include computers or storage devices, as well as combinations of these and other devices. One or more of the processing modules of system 100 may therefore each run on a server or other processing device.

Figure 4:
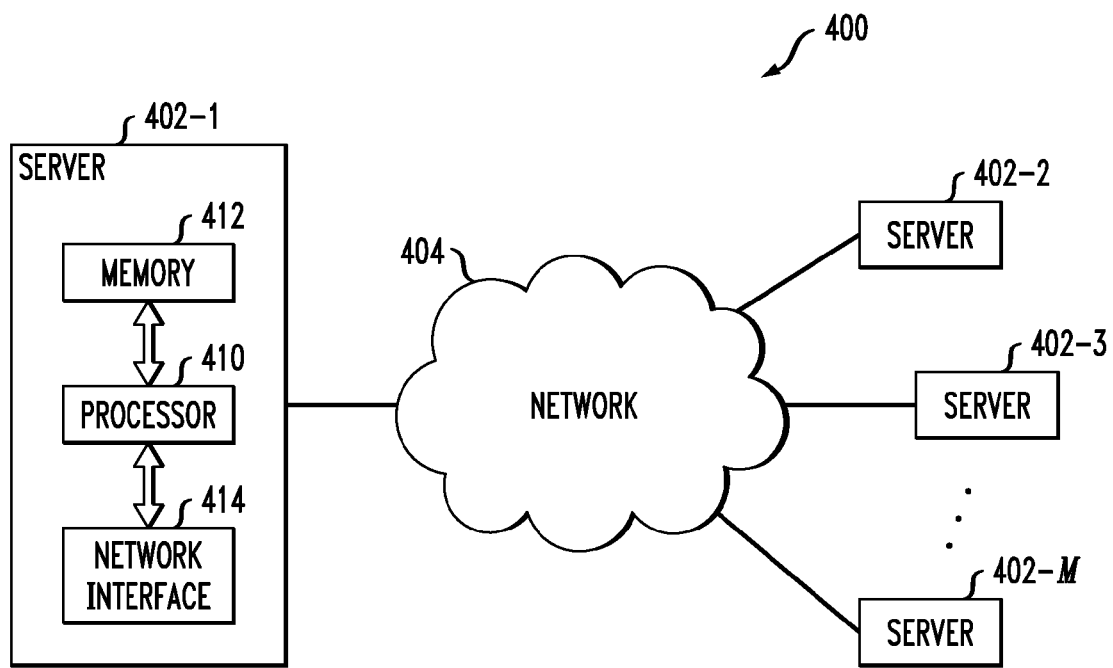
FIG. 4 shows an exemplary processing platform that implements at least a portion of the FIG. 1 system.

As illustrated in FIG. 4, such a server or other processing device generally comprises at least one processor and an associated memory, and implements one or more functional modules or other components for controlling certain features of the information processing system 100. Again, multiple ones of the processing modules of system 100 may be implemented by a single processing device in a given embodiment. Also, it should be noted that a given processing device may comprise one or more virtual machines.

The server 402-1 in the processing platform 400 more particularly comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. The memory 412 may be viewed as an example of what is more generally referred to herein as a "computer program product" having executable computer program code embodied therein. Such a memory may comprise electronic memory such as random access memory (RAM), read-only memory (ROM) or other types of memory, in any combination.

The computer program code when executed by a processing device such as the server 402-1 causes the device to perform functions associated with one or more of the modules of system 100, such as the multi-tenancy adapter 102. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the server 402-1 is network interface circuitry 414, which is used to interface the server with the network 404 and other system components. Such circuitry may comprise conventional transceivers of a type well known in the art.

The other servers 402 of the processing platform 400 are assumed to be configured in a manner similar to that shown for server 402-1 in the figure.

The processing platform 400 shown in FIG. 4 may comprise additional known components such as batch processing systems, parallel processing systems, physical machines, virtual machines, virtual switches, storage arrays, storage volumes, etc. Again, the particular processing platform shown in the figure is presented by way of example only, and system 100 may include additional or alternative processing platforms, as well as numerous distinct processing platforms in any combination.

Also, numerous other arrangements of computers, servers, storage devices, virtual machines or other processing devices are possible in the information processing system 100. Such devices can communicate with other elements of the information processing system 100 over any type of network, such as a wide area network (WAN), a local area network (LAN), a satellite network, a telephone or cable network, or various portions or combinations of these and other types of networks.

It was noted above that the system 100 may comprise cloud infrastructure, and such infrastructure may be implemented at least in part using a processing platform of the type shown in FIG. 4. Such cloud infrastructure may comprise virtual machines implemented using a hypervisor or other virtualization infrastructure running on physical infrastructure. Sets of applications may run on respective ones of the virtual machines under the control of the hypervisor. A given embodiment of cloud infrastructure may include multiple hypervisors, each running on its own physical infrastructure.

An example of a commercially available hypervisor platform that may be used to implement portions of the cloud infrastructure in one or more embodiments of the invention is the VMware® vSphere™ which may have an associated virtual infrastructure management system such as the VMware® vCenter™. The underlying physical infrastructure may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure in a given embodiment.

In other embodiments different arrangements of additional or alternative elements may be used. At least a subset of the elements may be collectively implemented on a common processing platform, or using separate processing platforms each comprising one or more computers, servers, storage devices, or other processing devices.

As indicated previously, multi-tenancy adapter functionality such as that described in conjunction with the diagrams of FIGS. 1-3 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and cloud infrastructure arrangements. Numerous other alternative embodiments within the scope of the appended claims will be readily apparent to those skilled in the art.

What is claimed is:

1. A method comprising the steps of:
   receiving a service request from a given one of a plurality of tenants sharing at least one product provided by a cloud service provider, the product comprising a software product running on a processing platform of the cloud service provider, the product not being configured to support multi-tenancy;
   generating a corresponding request directed to the product;

applying a tenant-specific service composition function associated with the given tenant to filter response information received back from the product in a manner specific to that tenant; and providing the filtered response information to the given tenant;

wherein the receiving, generating, applying and providing steps are implemented in a multi-tenancy adapter of the processing platform, the multi-tenancy adapter being configured to provide an interface between the tenants and the shared product; and wherein the multi-tenancy adapter comprises a plurality of tenant-specific portals for respective ones of the plurality of tenants.

2. The method of claim 1 wherein the receiving, generating, applying and providing steps are repeated for remaining ones of the plurality of tenants utilizing distinct tenant-specific service composition functions associated with those respective tenants, the tenant-specific composition functions of the plurality of tenants being managed by a service composition manager of the multi-tenancy adapter.

3. The method of claim 1 wherein the service composition function comprises a mashup function.

4. The method of claim 3 wherein the mashup function is configured utilizing Enterprise Mashup Markup Language (EMML).

5. The method of claim 1 wherein the step of applying a tenant-specific service composition function comprises retrieving tenant-specific mapping information characterizing which of a plurality of resources of the product are relevant to the given tenant.

6. The method of claim 5 wherein the step of providing the filtered response information to the given tenant comprises providing only information associated with those product resources that are relevant to the given tenant as determined from the tenant-specific mapping information.

7. The method of claim 6 wherein at least a portion of the filtered response information and corresponding unfiltered response information are archived under control of the multi-tenancy adapter to facilitate demonstration of filtering policy compliance.

8. The method of claim 6 wherein the filtered response information provides one or more of transformed vocabulary, response normalization and supporting analytics.

9. The method of claim 1 wherein the service composition function is one of a plurality of tenant-specific mashup functions associated with respective ones of the plurality of tenants and wherein the tenant-specific mashup functions are implemented using mashup middleware of the multi-tenancy adapter.

10. The method of claim 1 wherein each of the tenant-specific portals implements a corresponding proxy element for converting product-specific information from the product into tenant-specific information for the corresponding tenant using a corresponding one of a plurality of tenant-specific service composition functions.

11. The method of claim 10 wherein one or more of the proxy elements comprise respective application programming interface proxies.

12. The method of claim 1 wherein the tenant-specific portal of a given one of the plurality of tenants is not accessible by other ones of the plurality of tenants sharing the at least one product provided by the cloud service provider.

13. The method of claim 1 wherein:
the received service request comprises a tenant-specific request;

the corresponding request comprises a product-specific request invoking one or more full application programming interfaces for service components of the product; and applying the tenant-specific service composition function associated with the given tenant comprises:
receiving a product-specific response to the corresponding request;
retrieving tenant-specific mapping information for the given tenant; and
filtering the product-specific response utilizing the tenant-specific mapping information to generate tenant-specific filtered response information.

14. A computer program product comprising a non-transitory processor-readable storage medium having encoded therein executable code of one or more software programs, wherein the one or more software programs when executed cause a multi-tenancy adapter of a processing platform of a cloud service provider to perform the steps of:
receiving a service request from a given one of a plurality of tenants sharing at least one product provided by a cloud service provider, the product comprising a software product running on the processing platform of the cloud service provider, the product not being configured to support multi-tenancy;
generating a corresponding request directed to the product;
applying a tenant-specific service composition function associated with the given tenant to filter response information received back from the product in a manner specific to that tenant; and
providing the filtered response information to the given tenant;
wherein the multi-tenancy adapter is configured to provide an interface between the tenants and the shared product, and
wherein the multi-tenancy adapter comprises a plurality of tenant-specific portals for respective ones of the plurality of tenants.

15. An apparatus comprising:
at least one processing device comprising a processor coupled to a memory, said at least one processing device implementing a multi-tenancy adapter configured to provide an interface between a plurality of tenants and a product that is provided by a cloud service provider and shared by those tenants, the product comprising a software product running on a processing platform of the cloud service provider, the product not being configured to support multi-tenancy;
wherein the multi-tenancy adapter comprises a plurality of tenant-specific service composition functions associated with respective ones of the plurality of tenants; and
wherein in conjunction with receipt of a service request from a given one of the plurality of tenants, the multi-tenancy adapter generates a corresponding request directed to the product, applies the particular service composition function associated with the given tenant in order to filter response information received back from the product in a manner specific to that tenant, and provides the filtered response information to the given tenant, and
wherein the multi-tenancy adapter comprises a plurality of tenant-specific portals for respective ones of the plurality of tenants.

16. The apparatus of claim 15 wherein said at least one processing device is implemented within cloud infrastructure of the cloud service provider, said cloud infrastructure comprising physical infrastructure and associated virtualization infrastructure running on the physical infrastructure.

17. The apparatus of claim 15 wherein in applying the particular service composition function the multi-tenancy adapter retrieves tenant-specific mapping information characterizing which of a plurality of resources of the product are relevant to the given tenant.

18. The apparatus of claim 17 wherein in providing the filtered response information to the given tenant the multi-tenancy adapter provides only information associated with those product resources that are relevant to the given tenant as determined from the tenant-specific mapping information.

19. The apparatus of claim 15 wherein the tenant-specific service composition functions comprise respective tenant-specific mashup functions associated with respective ones of the plurality of tenants and wherein the tenant-specific mashup functions are implemented using mashup middleware of the multi-tenancy adapter.

20. The apparatus of claim 15 wherein each of the tenant-specific portals implements a corresponding proxy for converting product-specific information from the product into tenant-specific information for the corresponding tenant using a corresponding one of the plurality of tenant-specific service composition functions.

* * * * *